No. 820,753. PATENTED MAY 15, 1906.
J. L. ADAMS, Jr.
ELECTRICAL VIBRATORY MOTOR.
APPLICATION FILED MAR. 24, 1905.
4 SHEETS—SHEET 2.
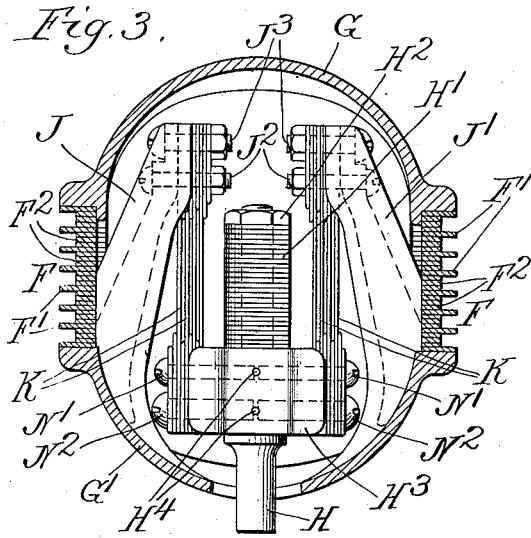
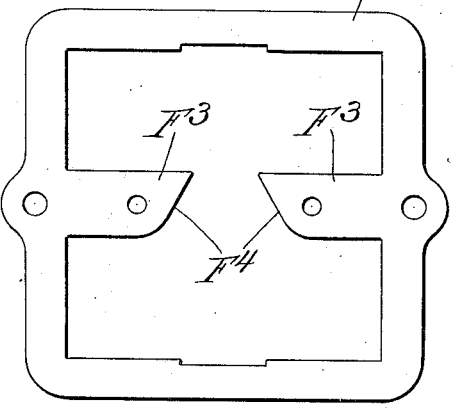
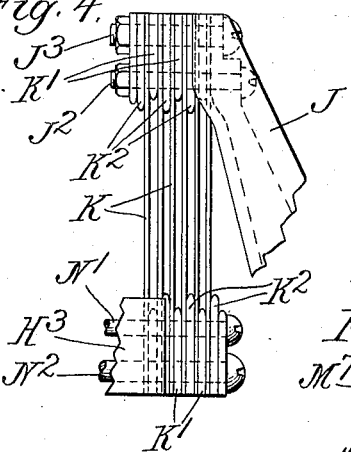
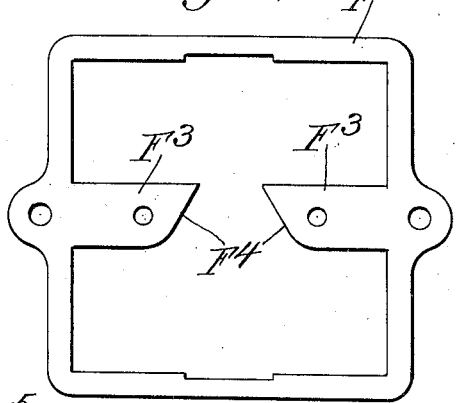
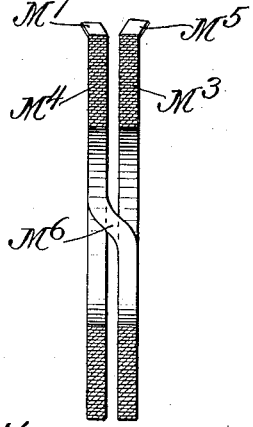
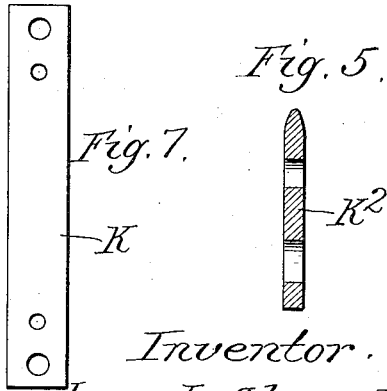
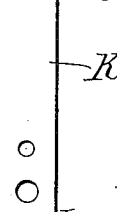
Witnesses.
Edward T. Wray.
Abbie E. Johnson.
Inventor.
James L. Adams, Jr.
by Parker & Carter
Attorney's.

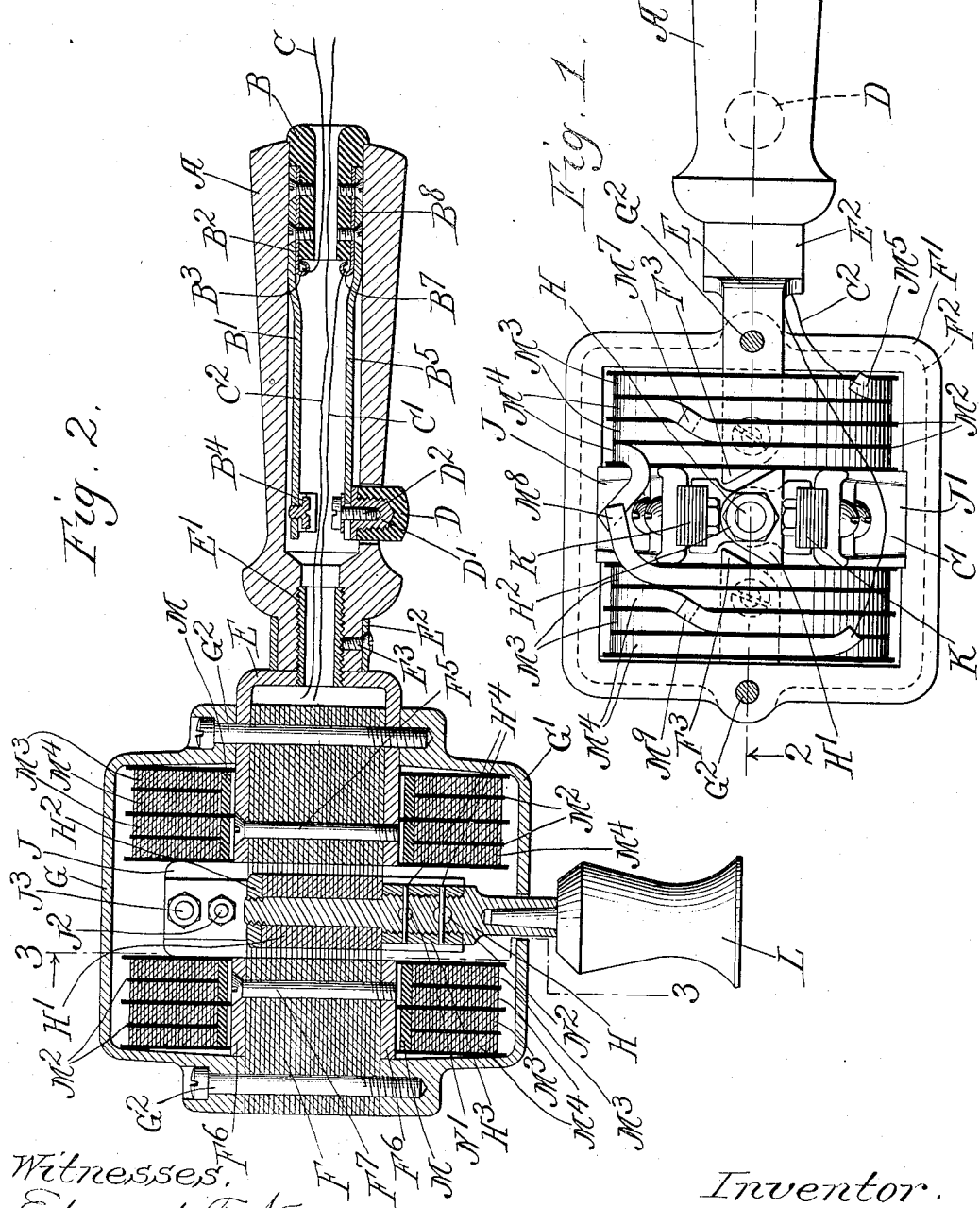

No. 820,753. PATENTED MAY 15, 1906.
J. L. ADAMS, Jr.
ELECTRICAL VIBRATORY MOTOR.
APPLICATION FILED MAR. 24, 1905.
4 SHEETS—SHEET 3.
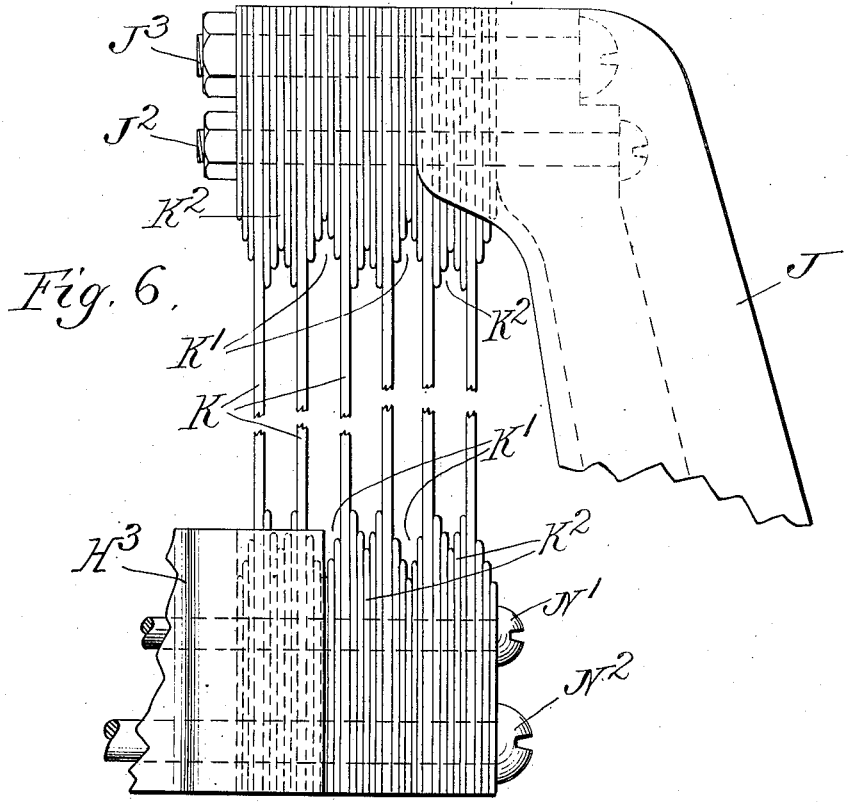
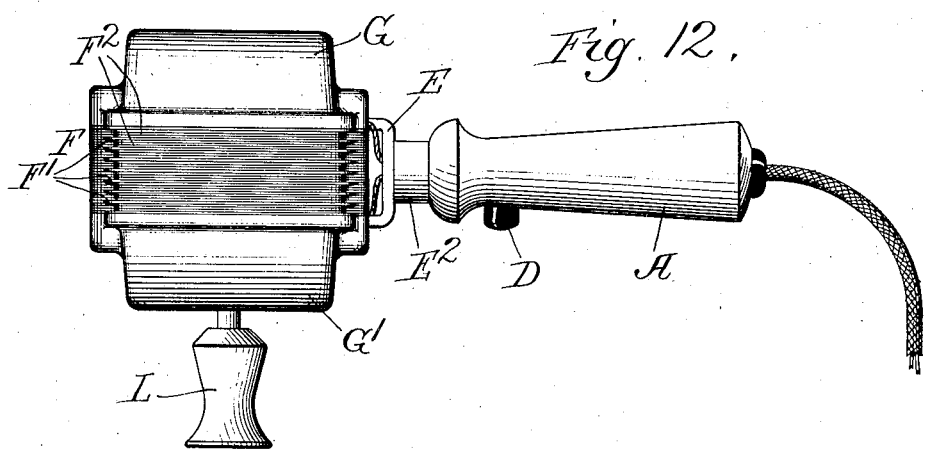
Witnesses.
Edward T. Wray.
Abbie E. Johnson.
Inventor.
James L. Adams Jr.
by Parker & Carter
Attorneys.

UNITED STATES PATENT OFFICE.

JAMES L. ADAMS, JR., OF SPRINGFIELD, ILLINOIS.

ELECTRICAL VIBRATORY MOTOR.

No. 820,753. Specification of Letters Patent. Patented May 15, 1906.

Application filed March 24, 1905. Serial No. 251,726.

*To all whom it may concern:*

Be it known that I, JAMES L. ADAMS, Jr., a citizen of the United States, residing at Springfield, in the county of Sangamon and State of Illinois, have invented a certain new and useful Improvement in Electrical Vibratory Motors, of which the following is a specification.

My invention relates to electric motors, and has for its object to provide new and improved constructions, particularly for motors of the vibratory type, in which lightness, compact form, durability, efficiency, and at the same time high speed and relatively great power per unit of size and weight are requisite.

My invention is illustrated in the accompanying drawings, wherein—

Figure 16:
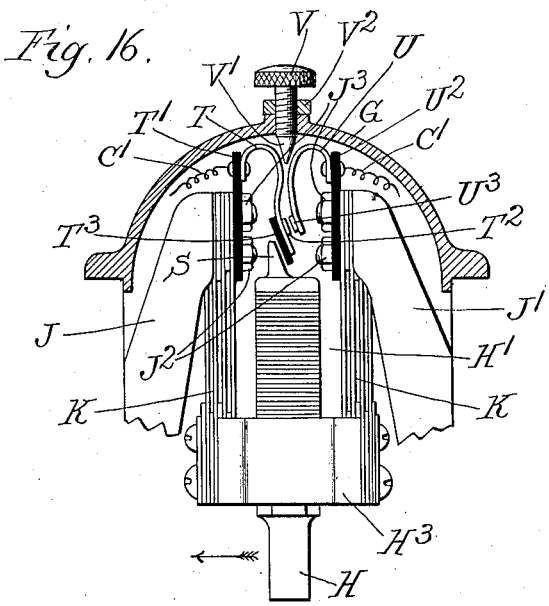
Figure 13:
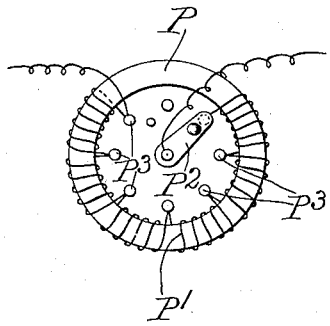
Figure 14:
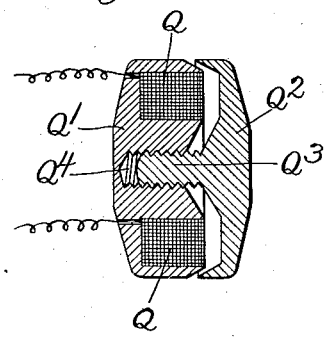
Figure 15:
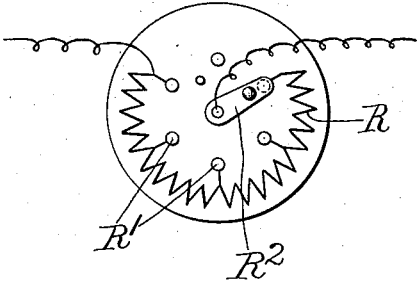

Figure 1 is a plan view of the apparatus with the upper part of the casing removed; Fig. 2, a sectional view on line 2 2 of Fig. 1; Fig. 3, a sectional view on line 3 3 of Fig. 2; Fig. 4, a detail of one of the compound springs supporting the moving element; Fig. 5, an enlarged cross-section of one of the spacers shown in Fig. 4; Fig. 6, an enlarged detail elevation of another preferred form of compound spring and spacers; Fig. 7, a detail showing form of one of the elastic leaves of the compound springs; Figs. 8 and 9, plan views of the field-core stampings; Fig. 10, a plan view of one of the armature-stampings; Fig. 11, a section through one of the coils removed from the spool, showing the path followed by the energizing-current; Fig. 12, a perspective elevation of the complete motor. Fig. 13 is a diagrammatic view showing one form of regulating device in plan. Fig. 14 is a section through another form of regulating device. Fig. 15 is a diagrammatic view of a third form of regulating device; and Fig. 16 is a vertical sectional view through a modified form of motor, illustrating a current-interrupting mechanism.

Like letters of reference indicate like parts in all the drawings.

I have illustrated and shall describe my invention as adapted for use as a massaging device, and the particular qualities and improvements which my invention embraces make it especially suitable for this sort of use. It will be clear, however, that the inventions herein described will be found susceptible of uses in other connections.

In the drawings, F represents the core of the magnetic field, which is clamped between the forks of the framework E. Its general form is that of a hollow rectangle with inwardly-extending salient pole-pieces, and I make its outer surface channeled or corrugated in order to facilitate radiation of heat. Preferably it is of laminated construction, as shown in the drawings, although that is not always absolutely essential. In such case the core is built up of relatively thin steel stampings F' and F² of two different sizes alternately arranged. These two sizes of stampings are shown in Figs. 8 and 9. In the arrangement shown in the drawings, for example, I interpose between each of the laminæ of greater area three of smaller size. The pole-pieces F³ F³ of the core extend inwardly and have oblique faces F⁴ F⁴, between which the armature is adapted to oscillate in a plane transverse to the polar axis. The stampings of the core F are bound firmly between the fork of the frame E by the screw F⁵ and are held together, further, by means of the binding-plates F⁶ F⁶ and the screw F⁷.

The casing covering the operating parts of the motor is preferably made of aluminium and comprises an upper cap G and a lower cap G', which are clamped together and to the framework E and the core F by means of the bolts G² G². By this form of construction I get a very rigid and at the same time light structure calculated to resist the vibration incident to a rapid and powerful vibratory motor.

The armature of the motor, which is adapted to vibrate between the pole-pieces F³ F³, is composed of a central rod H, which may be made of steel and of diminished diameter at its upper end to receive the soft-steel stampings H', a plan of one of which is shown in the detail view of Fig. 10. The form of the armature is preferably made to correspond generally to that of the air-gap between the pole-pieces F³ F³. These stampings are kept in position by means of the thin steel hexagon nut H². Below the stampings the rod H is screw-threaded to receive an aluminium block H³, which is held in position by the small screw N' and the large one N², the latter being prevented from backing out by the riveted dowel-pins H⁴ H⁴. The armature is supported on each side by a compound spring of peculiar construction, which I will now describe.

From the lower cap G' of the casing extend inwardly on each side the brackets J J', which are preferably made integral with the cap. Secured to each of these brackets is a plurality of flat elastic metal leaves K K, forming a compound spring. The construction is the same on both sides, except that the leaves attached to the bracket J, toward which the armature moves under the magnetic attraction of the pole-pieces, are sometimes, although not necessarily, made of some non-magnetic or only slightly magnetic metal, whereas the leaves of the spring mounted on the bracket J' are preferably made of a magnetic metal. With this exception, however, the arrangement is the same. The leaves of each compound spring must be of metal having a very high elastic limit of flexure at the usual operating temperature of the motor. The construction is best illustrated in the detail view of Fig. 4. As is here shown, the springs are secured to the bracket J by means of the bolts $J^2 J^3$, of different diameters, respectively, and between each leaf and the adjacent one is interposed a spacer. These spacers (designated by the letters $K'$ and $K^2$) are of two different sizes and are arranged in alternate order. Preferably the inner end of each spacer is rounded off until this end presents an elongated and approximately parabolic cross-section, as shown in the enlarged detail, Fig. 5. The springs are secured to the aluminium block $H^3$ in the same manner by means of the screws $N' N^2$, above referred to, the spacers $K' K^2$ being disposed by a similar staggered arrangement and in the same relative order. Another preferred form of spacer is the compound laminar type illustrated in Fig. 6 and in which the elastic leaves together forming each spacer are made in several lengths and superposed, the spacers between alternate leaves of the spring being of different lengths, relatively arranged as before mentioned and as shown in Fig. 6, above referred to. This construction, it will be seen, permits of a transverse displacement of the block $H^3$ and the armature proper without materially disturbing the parallelism of each pole-face and its opposed armature-surface, respectively, the peculiar construction of the compound springs, and particularly the staggered and rounded arrangement of the spacers, resulting in the flexure of the leaves of each spring at different points along their length at alternate half periods of oscillation of the armature and adding a great deal to the working life of the apparatus. The end of the rod H is provided with a socket in which is received the stem of the massaging implement L.

The field-coils may be of any desired sort. I have, however, devised a particular form of winding which has the advantages of lightness, very considerable firmness and mechanical strength, and of high insulating quality even after long and continued use under excessive vibration and rather higher than usual operating temperature. According to this construction the field-winding consists of a plurality of coils, here shown as four in number. Each of these coils is wound upon a ring of insulating material M and comprises a double spiral of thin aluminium ribbon M', insulated by a similar ribbon of paper, the two sections or spirals being separated by a sheet of mica $M^2$. As shown in the diagrammatic view of Fig. 11, the winding of the first coil $M^3$ describes an inward spiral, while that of the second section $M^4$ an outward spiral, the whole coil being ordinarily wound of a single unbroken strip of conducting material without joints. For binding purposes and additional insulation the coils are usually, although not necessarily, wrapped with silk or other satisfactory insulating-tape. Referring, then, to Figs. 1 and 11, the current will enter the outer turn of the first section of the first coil at $M^5$ and will then describe an inwardly spiral course and passing from the innermost part of the first section of the coil, as shown at $M^6$, will enter the second section of such coil, then circulating by an outward spiral through the second section of the coil will enter the first section of the next coil, as shown at $M^7$, the direction about the core of course remaining the same. The connection between the second and third coil is shown at $M^8$ and between the third and fourth at $M^9$. Fig. 12 is a perspective elevation of the complete motor, showing the thin aluminium caps used as a protective cover and the ribbed outer heat-radiating surface formed by the superposition of two different sizes of stampings by intermittently reversing a single size of a somewhat similar form of stamping or by channeling the solid metal forming the magnetic field-core of the device when a solid core is used and conveys a clear idea of the preferable form and general proportions of the machine and one of its massaging attachments.

Referring again to the drawings, A represents the handle, which is hollow and into which extends the hollow plug B, of any suitable insulating material. Secured to the plug B is the strip of metal B' in electrical contact with another strip $B^2$, which is preferably provided with a loop $B^3$ at its inner end, to which the conductor C, connected with one terminal of a suitable source of current-supply, is connected in any suitable manner. The other end of the strip B' carries the contact $B^4$. Secured to the plug B in the same manner is the elastic strip $B^5$ in electrical contact with another looped strip $B^6$, similar to the part $B^2$, to the loop of which, $B^7$, is suitably connected a conductor C', leading to one terminal of the field-circuit. The handle A is perforated to receive the controller-button D, of some insulating material, in which is embedded the metal plug D', screw-threaded to receive the screw $D^2$. The spring $B^5$ is drilled through at its inner end, so as to embrace the screw D², by means of which the parts are held in close contact. The conductor C² in circuit with the opposite terminal of the source of electric-supply is connected to the other terminal of the field-coils. Simple means are provided to prevent conductors C' and C² from interfering in any way with the proper operation of the contactors B⁴ and D².

The operative parts of the motor are supported on the forked framework E, into which is screwed the hollow threaded nipple E', the other end of which is inserted into the handle A. The handle may be strengthened at this point by the ferrule E² and the parts held firmly together and prevented from turning by the set-screw E³.

I have thus described with some detail one form of my motor; but it will be obvious that the construction here shown is susceptible of considerable change without departing from the purposes of my invention; nor is it necessary that all of the features of my invention should be used in combination. On the contrary, it would be possible to make some changes by substitution and alteration. I therefore do not wish to be considered as limiting myself to the forms, devices, and constructions herein shown and described nor to the precise adaptation to use to which this machine is put.

The use and operation of my motor are as follows:

The magnetizing-coils may be energized either by an alternating or by a pulsating direct current. In the form shown the apparatus is particularly adapted to be connected directly with a source of alternating-current supply of an ordinary commercial frequency, the strength of the compound springs being so determined that with the field excited the armature is powerfully and readily vibrated through a considerable amplitude in unison with every alternation of such energizing-current. If connected with a source of direct-current supply, an interrupter or a separate rotary converter or equivalent will of course be required, and in that event the vibration will correspond to the periodic variations of the current supplied to the motor-terminals. Such interrupter may either be integral with the motor mechanism or may be a separate and independent device capable of supplying intermittent or pulsating direct current to one or a multiplicity of vibratory motors.

To set the motor in action, the controller-button D is pressed inwardly by the hand, bringing together the contacts B⁴ D², thereby closing the circuit through the coils. The latter are preferably composed, as described, of a thin aluminium ribbon with paper-ribbon insulation, as this makes a very light and compact structure. They, however, may be of any ordinary type of coils.

The laminated structure of the core with the laminæ of two sizes is one of the advantageous features of my invention, as this promotes cool operation. By forming the pole-pieces with slanting faces and making the armature-faces of generally correspondent angles I secure an arrangement by which the maximum length of each air-gap, as well as the amount of total periodic variation in the length of such air-gaps between the pole-pieces and the armature, with the vibration of the latter, is materially diminished.

In a motor of this type, in which the armature is calculated to vibrate at a very high rate of speed and proportionally to its size with great force, it is of course absolutely essential to the durability and value of the apparatus that the moving part should be very firmly and yet sensitively supported. Furthermore, the displacement should be on lines as nearly as possible perpendicular to the common axial line of the salient poles and so as to preserve approximate parallelism between the respective polar and armature faces. The peculiar construction of my compound springs very efficiently meets these requirements. It is to be noted that the apparatus dispenses entirely with the use of shafts and the like requiring lubrication. The armature is suspended by and mounted upon two compound springs, which are provided at opposite ends with very firm and substantial methods of attachment to the armature and the motor-frame, respectively. The leaves of each spring are separated one from another either by simple or by laminated compound spacers of two different lengths alternately inserted in the successive spaces between leaves, the inner ends of all spacers being rounded off to an approximately parabolic cross-section, so as to form a convex gradually-curved seat or bearing for the springs. The springs are not, therefore, flexed immediately adjacent to the bolt-holes, but at some distance therefrom, the spacers serving the additional purpose of eliminating all rubbing friction between the leaves of each spring. The staggered arrangement of the spacers also adds materially to the life of the springs by shifting the location of the strain centers under flexure during alternate half periods of oscillation of the moving element. These details of the compound springs, the spacers, and general form of mounting used in connection therewith form especially important practical features of construction in a motor of the vibratory type, as in this class of machines it is found that the working life of the entire mechanism is practically dependent on the durability under operating conditions of the springs which support and are incorporated as a part of the oscillating element, the elastic limit of which springs is often very closely and repeatedly approached many times per second while the motor is in actual use. The amplitude of vibration of the moving element can be made readily adjustable by simple outside means, such as a device for gradually varying the amount of the voltage applied at the field-coil terminals of the machine either directly or through a small rheostatic device or on alternating current by means of a variable series resistance, as above, by an adjustable series reactance or by a combination of these two.

I have shown several devices for thus varying the amplitude of vibration of the moving element in Figs. 13 to 15, inclusive. Fig. 13 shows in a somewhat diagrammatic manner an adjustable alternating-current choke-coil comprising a circular core P, which may be made up of a plurality of annular sheet-steel rings, this core being surrounded by a winding P', divided into sections and connected up with the conductors supplying the motor, so that any number of the sections may be included in the circuit. This may be done in the customary manner by means of a switch $P^2$, movable over the contacts $P^3$ $P^3$. The self-induction of this coil when in circuit will result in decreasing the current supplied to the motor, and consequently the amplitude of vibration of the armature. I may also use another form of regulator for alternating currents, and this is shown in Fig. 14, which represents a coil Q wound on a core, forming a magnetic circuit interrupted by a variable air-gap. Q' represents the core upon which the winding is made, and $Q^2$ the movable member of the magnetic circuit, which has the screw part $Q^3$, taking into a socket $Q^4$ in the core Q'. By changing the relation of $Q^2$ and Q' the current supplied to the motor may obviously be varied.

In Fig. 15 I have shown an ordinary rheostatic device which is adapted to be used either with alternating or direct currents, R representing the winding, R' R' a plurality of contacts, and $R^2$ a switch engaging with the various contacts so as to cut out sections of the coil. When a direct current is used to operate the motor, it will be necessary to provide some sort of interrupter. Such mechanism may be outside of the motor-casing and may be of any desired type. I prefer to use, however, a form of current-interrupter adapted to be included within the motor-casing and to be operated through the agency of the oscillating member of the motor. Such mechanism is shown in Fig. 16, where the armature H' is provided at its upper end with a lug formation S, which is adapted to be moved against a spring T, attached to an insulating-block T', which is bolted to the bracket J by the same bolts which hold the elements of the armature-supporting spring. This spring R carries an electrode $T^2$ and is preferably provided on its under side with a buffer of insulating material $T^3$, against which the lug S abuts. To the bracket J is secured another spring U by means of the insulating-block U', this spring carrying the electrode $U^3$. The springs T U are connected up with the field-coils, the circuit being completed by the contact of electrodes $T^3$ $U^3$, which is effected at the back stroke of the armature—that is, in the direction opposite to the pull of the magnet and opposite to the arrow shown in Fig. 16. The variation in the amplitude of vibration may be effected by means of a screw V passing through an aperture in the casing G and carrying the insulating-point V', adapted to be inserted between the springs T U. A lock-nut $V^2$ sets the screw V in any desired position.

The framework, casings, and the laminæ of the core are all bound together by a few bolts in such a way as to form a very compact and light yet robust structure which is calculated to withstand the strain and vibration caused by the high speed and comparatively great power per unit of size and weight of the apparatus.

I claim—

1. In a vibratory electric motor, the combination of a field-core of magnetic material, a coiled winding for energizing such field-core, an air-gap in such field-core, and an elastically-supported armature adapted to oscillate in such air-gap such armature moved in one direction by magnetic force of the field-core and retracted by the elasticity of its support.

2. In a vibratory electric motor, the combination of a field-core of magnetic material, a coiled winding for energizing such field-core, a plurality of air-gaps in such field-core, and an elastically-supported armature adapted to vibrate in such air-gaps, such armature moved in one direction by magnetic force of the field-core and retracted by the elasticity of its support.

3. In a vibratory electric motor, the combination of a field-core of magnetic material, a coiled winding for energizing such field-core, an air-gap in such field-core, and an elastically-supported armature adapted to oscillate in such air-gap in synchronism with the periodic variations in strength of the exciting-current, such armature moved in one direction by magnetic force of the field-core and retracted by the elasticity of its support.

4. In a vibratory electric motor, the combination of a field-core having an air-gap, a coiled energizing-winding for such core, and an elastically-supported armature adapted to readily oscillate in such air-gap in unison with every half-cycle of an alternating exciting-current such armature moved in one direction by magnetic force of the field-core and retracted by the elasticity of its support.

5. In a vibratory electric motor, the combination of a field-core having an air-gap, a coiled energizing-winding for such core, and an elastically-supported armature adapted to readily oscillate in such air-gap in unison with every complete cycle of an alternating exciting-current such armature moved in one direction by magnetic force of the field-core and retracted by the elasticity of its support.

6. In a vibratory electric motor, the combination of a field-core having an air-gap, a coiled energizing-winding for such core, an elastically-supported armature adapted to readily oscillate in such air-gap, and a convenient controlling-switch for such exciting-current such armature moved in one direction by magnetic force of the field-core and retracted by the elasticity of its support.

7. In an electric motor, the combination of a hollow field-core formed by the superposition of laminæ of different dimensions so as to have corrugated or uneven heat-radiating surfaces, a coiled energizing-winding for such core, and an armature adapted to move within the hollow core.

8. In an electric motor, the combination of a hollow field-core having corrugated or uneven heat-radiating surfaces, such core forming a portion of the inclosing case of the motor a coiled energizing-winding for such core, and an armature adapted to move within the hollow core.

9. In a vibratory electric motor, the combination of a field-core, a coiled energizing-winding for such core, an angular air-gap formed by the slanting pole-faces of such core, and an armature having two faces of approximately corresponding obliquity, said armature being elastically supported so as to readily oscillate toward and away from the slanting pole-faces of such core.

10. In a vibratory electric motor, the combination of a field-core, a coiled energizing-winding for such core, a suitably-formed air-gap in such core, a spring-supported armature adapted to readily oscillate in such air-gap, and substantial means for attaching the spring element to such armature and to said core.

11. In a vibratory electric motor, the combination of a field-core, a coiled energizing-winding for such core, a suitably-formed air-gap in said core, a spring-supported armature adapted to readily oscillate in such air-gap, an inclosing casing firmly attached to said core, and substantial means for attaching the spring element to such armature, and to said inclosing casing.

12. In a vibratory electric motor, the combination of a field-core, a coiled energizing-winding for such core, a suitably-formed air-gap in such core, and an armature elastically supported on a plurality of flat springs and adapted to readily oscillate in such air-gap.

13. In a vibratory electric motor, the combination of a field-core, a coiled energizing-winding for such field-core, a suitably-formed air-gap in such core, and an armature elastically supported on compound leaf-springs, the leaves of which are separated from one another by suitably-formed spacers placed at the ends of such springs, the latter being substantially attached to said armature and to motor-frame, said armature being thereby adapted to readily oscillate in said air-gap, substantially as shown.

14. In a vibratory electric motor, the combination of a field-core, a coiled energizing-winding for such core, a suitably-formed air-gap in such core, and an armature elastically supported on compound springs, the individual leaves of which are separated from one another by suitably-formed compound leaf-spacers, the individual leaves of which latter are of a plurality of lengths, said compound spacers being placed between the ends of said compound springs, said springs being substantially attached to said armature and to motor-frame, said armature being adapted to readily oscillate in said air-gap, substantially as shown.

15. In an electric motor, the combination of a field-core having poles with oblique faces, an energizing-winding for such core, a suitable air-gap in such field-core, an armature having surfaces of approximately corresponding obliquity to said pole-faces and adapted to oscillate in such air-gap, such armature being elastically supported in such manner as to maintain approximate parallelism between its oblique surfaces and the corresponding pole-faces.

16. In an electric motor, the combination of an electromagnet with an armature, and two separate springs supporting such armature so as to permit of an approximately parallel motion of such armature, one of such springs being of non-magnetic material.

17. In a vibratory electric motor, the combination of a field-core, a coiled energizing-winding for such core, a suitably-formed air-gap in such core, a spring-supported armature adapted to readily oscillate in such air-gap, and a current-interrupter adapted to periodically make and break the exciting-circuit of said field-core.

18. In a vibratory electric motor, the combination of a field-core, a coiled energizing-winding for such core, a suitably-formed air-gap in such core, a spring-supported armature adapted to readily oscillate in such air-gap, and external electrical means for regulating the amplitude of vibration of such armature.

19. In a vibratory electric motor, the combination of a field-core; a coiled energizing-winding for such core; a suitably-formed air-gap in such core; a spring-supported armature adapted to readily oscillate in such air-gap; and convenient external mechanical means for regulating the amplitude of vibration of such armature.

20. In a vibratory electric motor, the combination of a field-core; an energizing-winding for such field-core; a suitably-tapered air-gap in such core; an armature of appropriate form adapted to readily oscillate in such air-gap; a plurality of leaf-springs supporting such armature; an inclosing casing; substantial means for attaching said springs to said armature and to said inclosing casing; and means for conducting the exciting-current from a supply-outlet to the winding of said vibratory motor.

21. In a vibratory electric motor, the combination of a laminated magnetic field-core having internal salient poles and channeled outer heat-radiating surfaces; an energizing-winding for such field-core, such winding being formed of a plurality of spirally-wound, insulated aluminium ribbon coils; a tapering air-gap formed by the oblique pole-faces of said field-poles; a laminated armature having faces of corresponding obliquity and adapted to oscillate in such tapering air-gap; a plurality of compound flat leaf-springs supporting said armature; rounded spacers of two different lengths separating alternate leaves of such compound springs; a light aluminium inclosing casing firmly attached to said core; substantial means for attaching such compound springs to the armature and to said inclosing casing; a convenient controlling-switch; and conductors whereby said motor may be connected to a supply-circuit.

22. In an electric motor, a hollow field-core forming a portion of the inclosing case of the motor having one or more uneven outer heat-radiating surfaces formed by the repeated superposition of laminæ having different dimensions with respect to one or more of the axes of said field-core.

23. In an electric motor, the combination of a field-core; an energizing-winding for such core; a tapered air-gap in such core; an armature of corresponding obliquity adapted to readily oscillate in such air-gap; a light inclosing casing; projecting brackets depending from, and integral with such casing; and a set of flat, elastic springs firmly attached at one end to said brackets, said armature being solidly mounted on the other end of such springs in such manner as to readily permit vibratory motion in such armature.

24. In an electric motor, the combination of a light casing composed of two sections bolted together, with a field-core and its necessary winding bolted between the two integral parts of such casing; and an armature elastically suspended from the interior of such casing.

25. In an electric motor, the combination of a field-core; an energizing-winding for such core; an air-gap in said core; an armature elastically suspended and adapted to oscillate in such air-gap; a two-part inclosing casing between the integral parts of which above core, winding and elastically-supported armature are bolted; a handle to which said core and casing are firmly secured; and a manually-operated controlling-switch incorporated in said handle.

26. In a vibratory electric motor adapted to be energized by alternating, or by a pulsating direct current, the combination of a field-core; an energizing-winding for such core; an air-gap in such core; an armature movably mounted in such air-gap; an inclosing casing; and springs attached to said armature and to such inclosing casing; said armature and springs forming an elastically-supported moving element adapted to vibrate in unison with the periodic variations in strength of such current.

27. In an electric motor, the combination of a core with an armature supported so as to move to and from such core, the adjacent surfaces of the armature and the core being formed on lines oblique with respect to the direction of movement of such armature so that the distances between the armature and the core are short relative to the displacement of the armature throughout the travel of the same.

28. In a vibratory device, the combination of a supporting part, with an oscillating member, a compound spring connected at one end to the oscillating member and at the other to the supporting part, such spring comprising a plurality of leaves.

29. In a vibratory device, the combination of a supporting part, with an oscillating member, a compound spring connected at one end to the oscillating member and at the other to the supporting part, such spring comprising a plurality of leaves and a plurality of spacers between the leaves.

30. In a vibratory device, the combination of a supporting part, with an oscillating member, a compound spring connected at one end to the oscillating member and at the other to the supporting part, such spring comprising a plurality of leaves and a plurality of spacers of alternate lengths between the leaves.

31. In a vibratory device, the combination of two supporting-brackets with an oscillating member and means for elastically supporting such oscillating member, comprising two compound springs each of which is secured at one end to the oscillating member and at the other to one of the supporting-brackets, each of such springs comprising a plurality of leaves, and interposed between such leaves a plurality of spacers of different lengths arranged alternately.

JAMES L. ADAMS, Jr.

Witnesses:
 RUDOLPH W. HAAS,
 JOHN ILES.